US012759408B2

(12) United States Patent
Theodosakis et al.

(10) Patent No.: US 12,759,408 B2
(45) Date of Patent: Oct. 13, 2026

(54) SYSTEMS AND METHODS FOR INTERNAL DISCHARGE OF BATTERY SYSTEMS

(71) Applicant: Textron Inc., Providence, RI (US)

(72) Inventors: Gregory August Theodosakis, Martinez, GA (US); Russell William King, Evans, GA (US); Charles Daniel Dauchess, North Augusta, SC (US); Christopher Kenneth Furman, Evans, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 108 days.

(21) Appl. No.: 18/797,207

(22) Filed: Aug. 7, 2024

(65) Prior Publication Data

US 2026/0042354 A1 Feb. 12, 2026

(51) Int. Cl.

| | |
|---|---|
| ***B60L 3/04*** | (2006.01) |
| ***B60L 1/02*** | (2006.01) |
| ***B60L 1/14*** | (2006.01) |
| ***B60L 3/00*** | (2019.01) |
| ***B60L 50/60*** | (2019.01) |
| ***H01M 10/42*** | (2006.01) |
| ***H01M 50/204*** | (2021.01) |
| ***H01M 50/24*** | (2021.01) |
| ***H01M 50/249*** | (2021.01) |
| ***H01M 50/512*** | (2021.01) |

(52) U.S. Cl.

CPC .................. *B60L 3/04* (2013.01); *B60L 1/02* (2013.01); *B60L 1/14* (2013.01); *B60L 3/0046* (2013.01); *B60L 50/60* (2019.02); *H01M 10/425* (2013.01); *H01M 50/204* (2021.01); *H01M 50/249* (2021.01); *H01M 50/512* (2021.01); *B60L 2200/22* (2013.01); *H01M 2010/4271* (2013.01); *H01M 2220/20* (2013.01)

(58) Field of Classification Search

CPC ...... B60L 3/04; B60L 1/02; B60L 1/14; B60L 3/0046; B60L 50/60; H01M 10/425; H01M 50/204; H01M 50/249; H01M 50/512

See application file for complete search history.

(56) References Cited

U.S. PATENT DOCUMENTS

| | | | |
|---|---|---|---|
| 4,305,254 | A | 12/1981 | Kawakatsu et al. |
| 4,313,080 | A | 1/1982 | Park |
| 4,869,975 | A | 9/1989 | Eppley et al. |
| 4,902,956 | A | 2/1990 | Sloan |

(Continued)

*Primary Examiner* — Tyler J Lee

(74) *Attorney, Agent, or Firm* — Foley & Lardner LLP

(57) ABSTRACT

A golf vehicle includes a chassis, a front axle coupled to the chassis, a rear axle coupled to the chassis, a battery pack supported by the chassis and including a plurality of battery cells, an electric motor powered by the battery pack, and a vehicle control system. The vehicle control system includes a battery management system coupled to the battery pack and a motor controller coupled to the electric motor and the battery management system. The battery management system is configured to monitor the battery pack, detect a fault, and trigger a discharge protocol for the battery pack in response to the fault to prevent an overcharge condition. The motor controller is configured to provide direct current power from the battery pack to the electric motor to discharge the battery pack in response to the discharge protocol.

20 Claims, 5 Drawing Sheets

(56) References Cited

U.S. PATENT DOCUMENTS 5,343,137 A 8/1994 Kitaoka et al.
5,557,181 A 9/1996 Naito et al.
5,569,999 A 10/1996 Boll et al.
5,808,428 A 9/1998 Ito et al.
5,905,360 A * 5/1999 Ukita ........................ B60K 6/28 320/121
6,008,626 A 12/1999 Sato et al.
6,054,818 A 4/2000 Tabata et al.
6,137,292 A 10/2000 Hirsch et al.
6,163,135 A 12/2000 Nakayama et al.
6,232,748 B1 5/2001 Kinoshita
6,249,106 B1 6/2001 Turner et al.
6,388,426 B1 5/2002 Yokoo et al.
6,561,295 B1 5/2003 Kuroda et al.
6,646,845 B1 11/2003 Turner et al.
6,664,000 B1 12/2003 Sonobe
6,943,460 B2 9/2005 Wakashiro et al.
7,154,068 B2 12/2006 Zhu et al.
8,314,364 B2 11/2012 Brust et al.
8,575,897 B2 11/2013 Masuda
8,694,185 B2 4/2014 Sakamoto et al.
10,336,209 B2 7/2019 Roeder et al.
10,931,134 B2 * 2/2021 Tang .......................... H02J 7/02
10,960,246 B2 3/2021 Stadler
2003/0118891 A1 6/2003 Saito et al.
2003/0218447 A1 11/2003 Coates et al.
2005/0237026 A1 10/2005 Hall et al.
2006/0011392 A1 1/2006 Tan
2006/0012244 A1 1/2006 Tan
2007/0118255 A1 5/2007 Wakashiro et al.
2007/0138998 A1 6/2007 Togashi et al.
2007/0233334 A1 10/2007 Kozarekar
2007/0247106 A1 10/2007 Kawahara et al.
2007/0279949 A1 12/2007 Yokota
2008/0190674 A1 8/2008 Nakanishi
2010/0087976 A1 4/2010 Aridome et al.
2011/0180337 A1 7/2011 Khatchikian et al.
2012/0261397 A1 10/2012 Schwarz et al.
2013/0015050 A1 1/2013 Bloom et al.
2013/0226377 A1 8/2013 Stanek et al.
2014/0055092 A1 2/2014 Gibeau
2014/0088809 A1 3/2014 Hermann et al.
2014/0232302 A1 8/2014 Tsushima
2014/0309824 A1 10/2014 Bito
2015/0002053 A1 1/2015 Endo et al.
2015/0239366 A1 8/2015 Jestin et al.
2016/0090052 A1 3/2016 Nishijima et al.
2019/0031183 A1 * 1/2019 Lim .......................... B60L 7/16
2023/0088976 A1 3/2023 Schimpe
2023/0145202 A1 * 5/2023 Liao ........................ B60L 53/22 320/128
2023/0311708 A1 10/2023 Fujita et al.
2024/0027534 A1 * 1/2024 Hori ...................... H01M 10/48

* cited by examiner

SYSTEMS AND METHODS FOR INTERNAL DISCHARGE OF BATTERY SYSTEMS

BACKGROUND

Electric vehicles typically include battery management systems. Battery management systems can monitor, control, and maintain the health and efficiency of batteries of such electric vehicles.

SUMMARY

One embodiment relates to a golf vehicle. The golf vehicle includes a chassis, a front axle coupled to the chassis, a rear axle coupled to the chassis, a battery pack supported by the chassis and including a plurality of battery cells, an electric motor powered by the battery pack where the electric motor is configured to drive at least one of the front axle or the rear axle, and a vehicle control system. The electric motor is a three-phase alternating current motor or a separately excited direct current motor. The vehicle control system includes a battery management system coupled to the battery pack and a motor controller coupled to the electric motor and the battery management system. The battery management system is configured to monitor the battery pack, detect a fault, and trigger a discharge protocol for the battery pack in response to the fault to prevent an overcharge condition. The motor controller is configured to provide direct current power from the battery pack to the electric motor to discharge the battery pack in response to the discharge protocol.

Another embodiment relates to a vehicle. The vehicle includes a front axle, a rear axle, a battery pack including a first battery module and a second battery module coupled in parallel with the first battery module, a three-phase alternating current motor powered by the battery pack and configured to drive at least one of the front axle or the rear axle, and a vehicle control system. The vehicle control system is configured to trigger a discharge protocol for the battery pack in response to a fault associated with the battery pack and provide direct current power from the battery pack to the three-phase alternating current motor to discharge the battery pack in accordance with the discharge protocol.

Still another embodiment relates to a vehicle system. The vehicle system includes one or more processing circuits including one or more memory devices storing instructions thereon. The instructions, when executed by one or more processors, cause the one or more processors to monitor a battery system of a vehicle where the battery system is configured to provide power to an alternating current motor of the vehicle that drives an axle of the vehicle, detect a fault associated with the battery system, trigger a discharge protocol for the battery system in response to the fault, and provide direct current power from the battery system to the alternating current motor to discharge the battery system in accordance with the discharge protocol.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
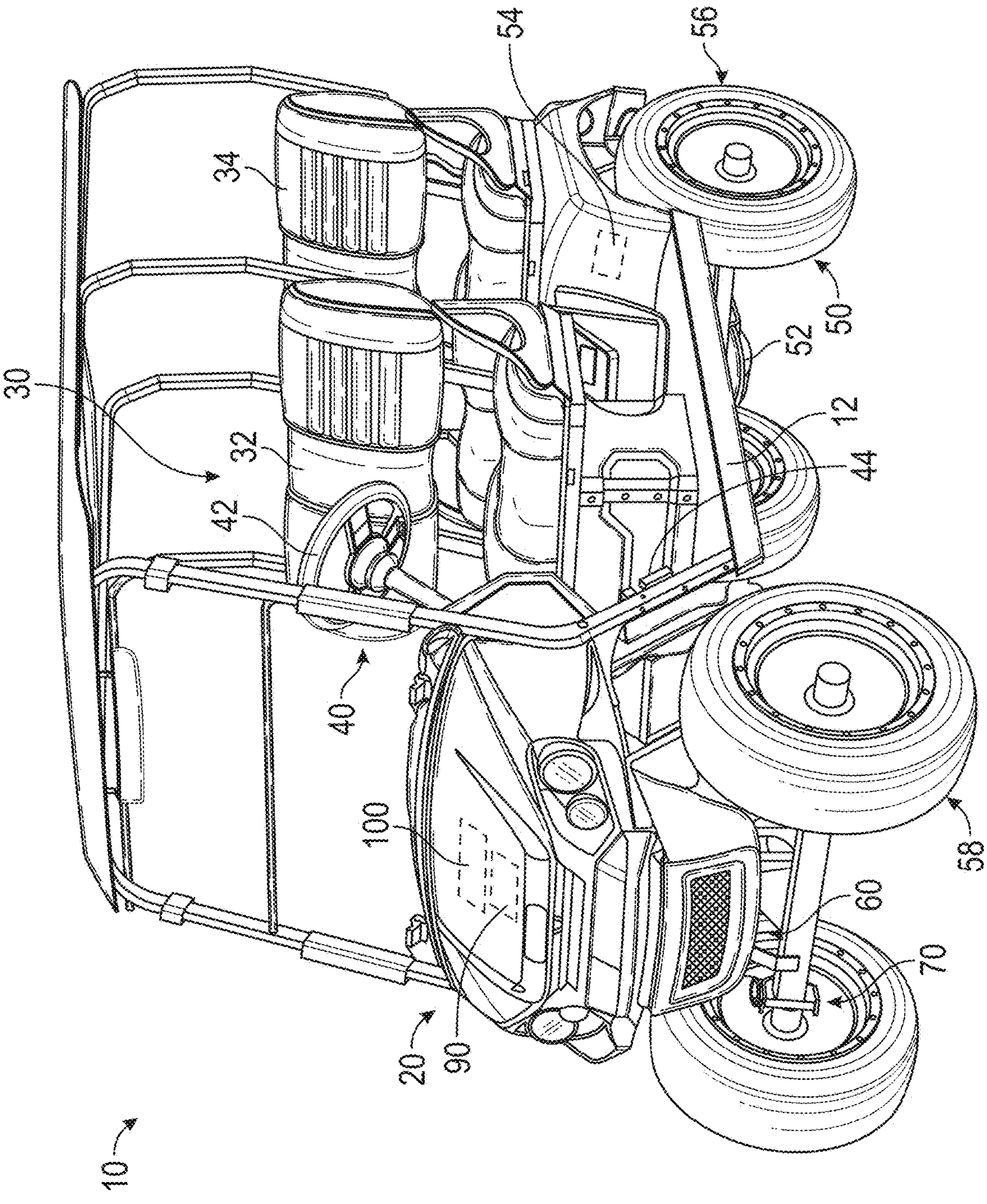
FIG. 1 is a perspective view of a vehicle, according to an exemplary embodiment.
Figure 2:
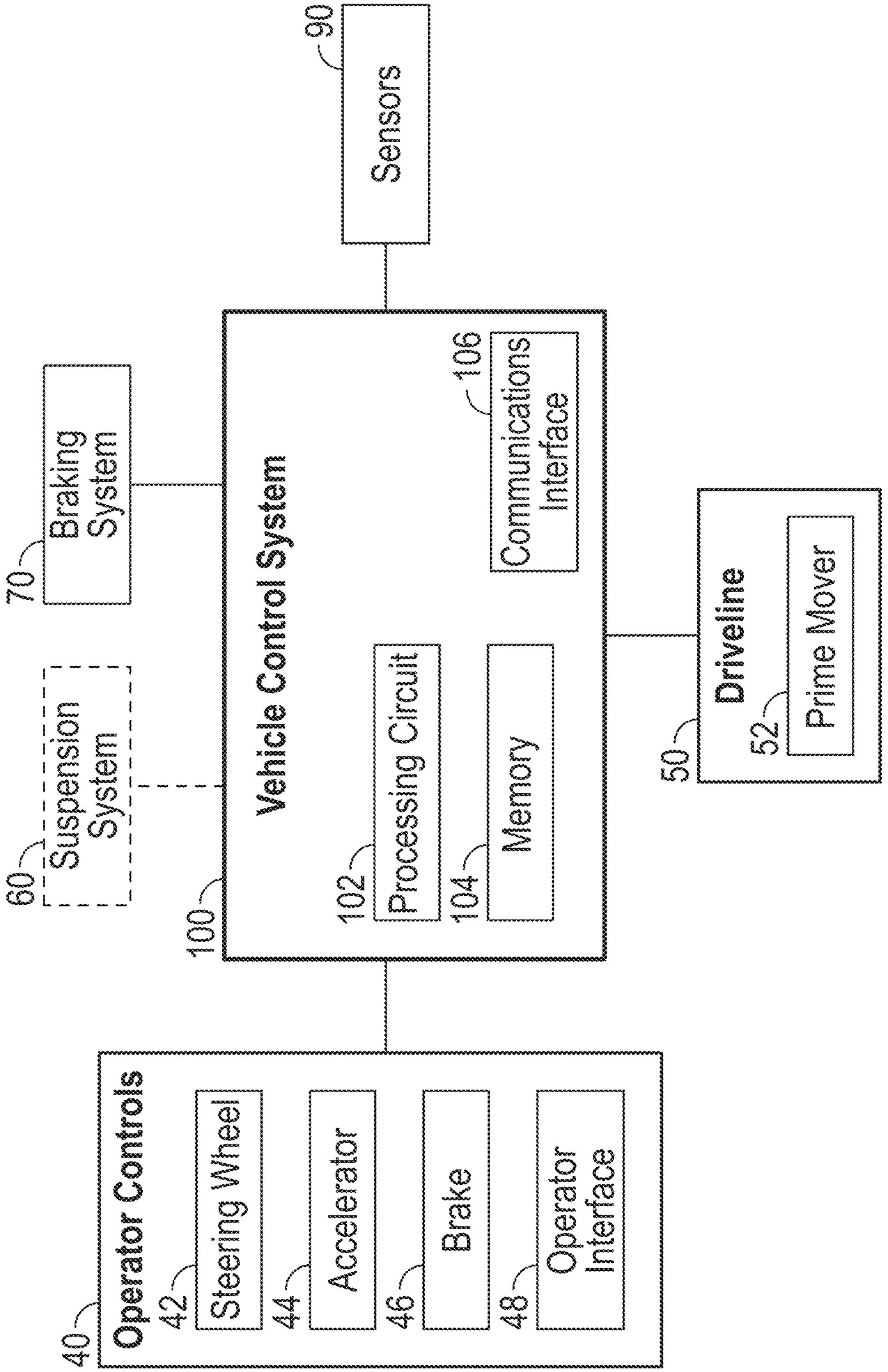
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart or vehicle, an all-terrain vehicle ("ATV"), a utility task vehicle ("UTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course).

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor (e.g., motor 408) and the energy storage 54 is a battery system (e.g., battery module 404, add-on battery module(s) 406, etc.). In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some implementations, the braking system 70 can include a regenerative braking system that utilizes the motor to provide service braking by converting kinetic energy back into electrical energy. The braking system 70 can recharge the battery (e.g., battery module 404) while decelerating. The braking system 70 can employ an automatic, electromagnetic parking, and/or emergency brake system.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Site Monitoring and Control System

Figure 3:
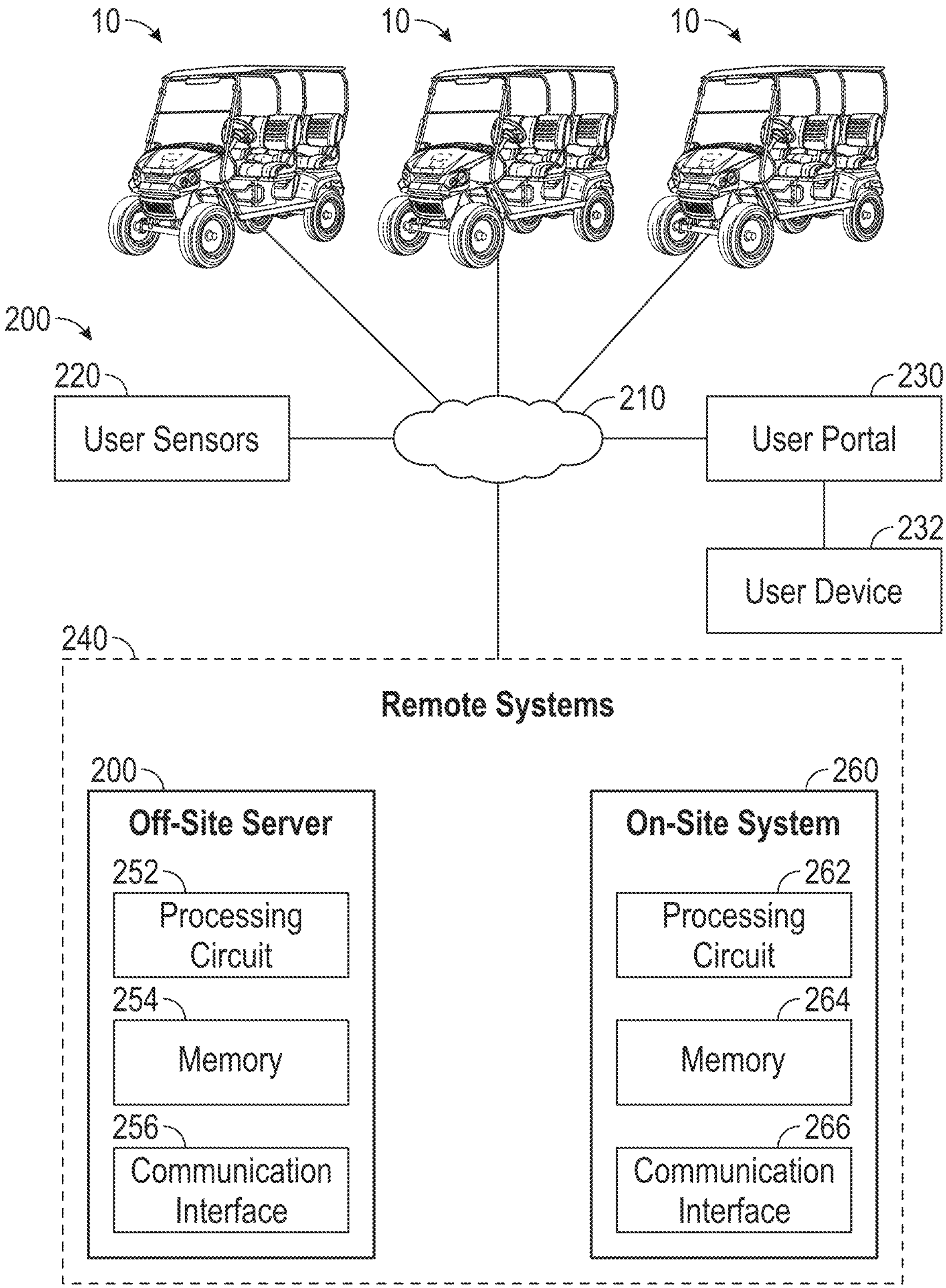
FIG. 3 is a schematic block diagram of a site monitoring and control system including a plurality of the vehicles of FIG. 1, according to an exemplary embodiment.

As shown in FIG. 3, a monitoring and control system, shown as site monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10 and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, hear rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course) such as for advanced scheduling purposes, to identify persons braking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 3, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Discharge of Battery System

Figure 4:
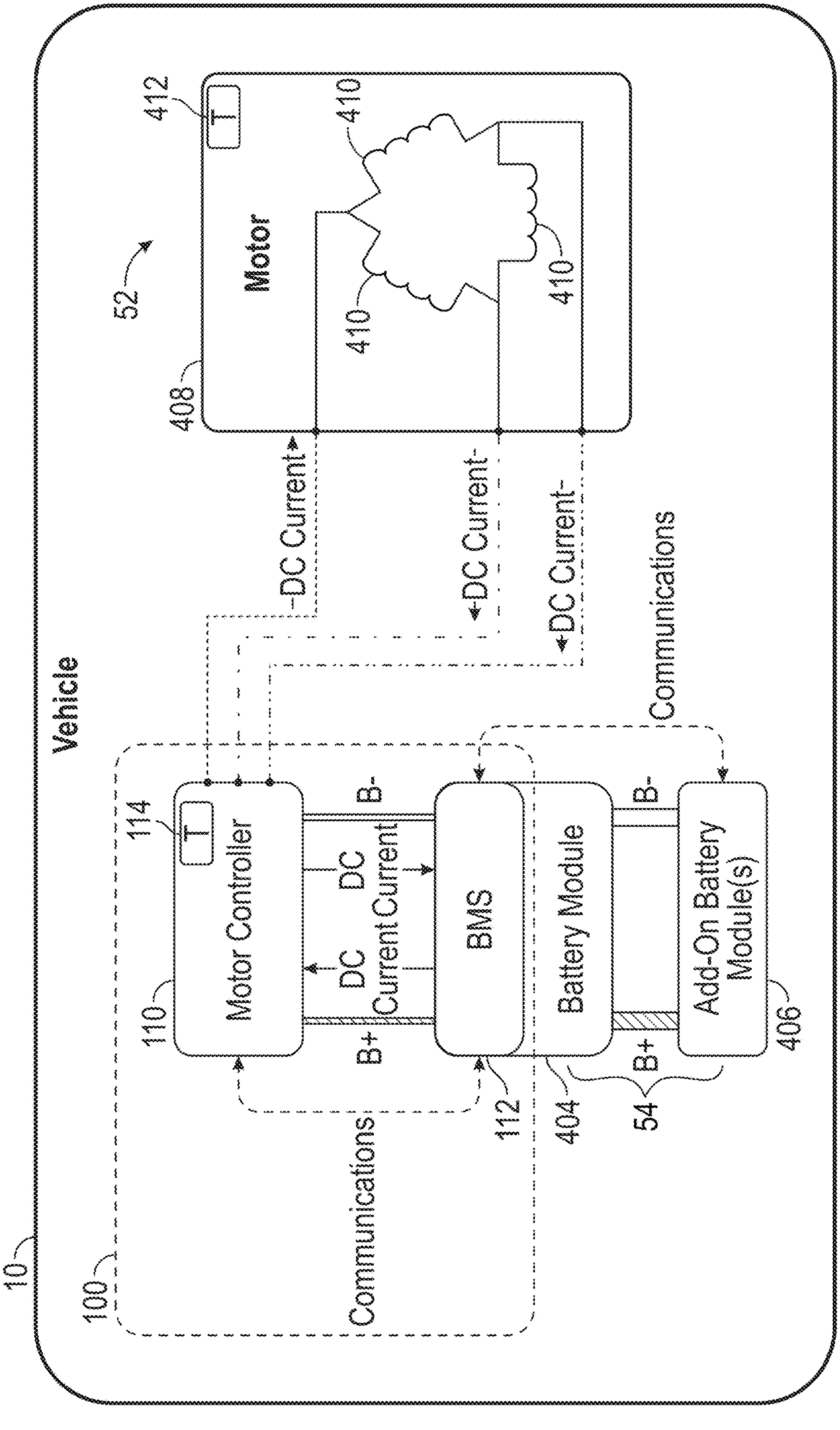
FIG. 4 is another schematic block diagram of the vehicle of FIG. 1, according to an exemplary embodiment.

According to the exemplary embodiments shown in FIG. 4, (a) the prime mover 52 is configured as a three-phase, alternating current ("AC") electric motor, shown as motor 408, including three sets of windings, shown as motor windings 410, and a sensor, shown as motor sensor 412; (b) the energy storage 54 is configured as a battery system including a first battery pack or module, shown as battery module 404, and one or more second battery packs or modules, shown as add-on battery module(s) 406, electrically coupled to the battery module 404 in parallel; and (c) the vehicle control system 100 includes (i) a first controller, shown as motor controller 110, coupled to the motor 408 and including a sensor, shown as motor controller sensor 114, and (ii) a second controller, shown as battery management system ("BMS") 112, coupled to the motor controller 110 and the energy storage 54 (e.g., the battery system, the battery module 404, the add-on battery module(s) 406, etc.). According to an exemplary embodiment, the motor sensor 412 and the motor controller sensor 114 include a temperature sensor. In some embodiments, the motor sensor 412 and the motor controller sensor 114 additionally or alternative include other types of sensors (e.g., voltage sensors, current sensors, speed sensors, etc.). The motor controller 110 and the BMS 112 may each include a processing circuit 102, a memory 104, and a communications interface 106. In some embodiments, the motor 408 is configured as a separately excited DC motor.

According to an exemplary embodiment, each of the battery module 404 and the add-on battery module(s) 406 of the battery system includes one or more rows of battery cells. The BMS 112 may be configured to monitor characteristics of the rows of battery cells of the battery module 404 and the add-on battery module(s) 406 including, but not limited to, voltage, temperature, and state of charge ("SOC"). The BMS 112 may also be configured to provide direct current ("DC") power from the battery system to the motor controller 110 to power the motor 408 based on driving demands of the vehicle 10.

According to an exemplary embodiment, the motor controller 110 is configured to manage the power supplied to the motor 408. By way of example, the motor controller 110 may be configured to modulate the voltage, current, phase, and/or frequency of the power sent to the motor windings 410, which can influence the torque and speed output provided by the motor 408. In some embodiments, the motor controller 110 is configured to control a type of power, AC power or DC power, delivered to the motor 408. By way of example, the motor controller 110 may be configured to convert the type of power from DC power to AC power and/or regulate the AC power or DC power depending on the intended function of the motor 408. The motor controller 110 may include components to invert, convert, or otherwise modulate DC power and/or AC power.

As shown in FIG. 4, the energy storage 54 is configured to supply (e.g., via electrical wiring, electrical connections, etc.) DC power to the motor controller 110. In some embodiments, the DC power flows from the energy storage 54, through the BMS 112, and to the motor controller 110. The BMS 112 and the motor controller 110 may include communication interfaces (e.g., communications interfaces 106) that facilitate exchanging data related to operational status, command signals, and feedback therebetween. The BMS 112 and the add-on battery module 406 (e.g., a BMS thereof) may include communication interfaces that facilitate exchanging data related to operational status, command signals, and feedback therebetween. The add-on battery module(s) 406 is (are) configured to provide additional battery cells and increase the total energy storage capacity of the energy storage 54. As shown in FIG. 4, the battery module 404 and the add-on battery module 406 are connected in parallel (e.g., via wires, connection busses, etc.) to provide for a pathway of electrical transfer.

When a battery module within a battery system experiences a fault or failure condition, an imbalance can arise with the battery system. The faulty or failing battery module can be affected by other healthy battery modules within the battery system due to their parallel connection. For example, the voltage of the faulty or failing cells and/or modules may fall. As a result, the healthy battery modules may attempt to maintain a constant voltage across the battery system by providing electric current to the faulty or failing modules, which can lead to an overcharge condition. Overcharging batteries can lead to internal damage, excessive heat dissipation, thermal runaway, and degradation. Accordingly, the systems and methods, as described in greater detail herein, are configured to detect such potential for an overcharge condition and take mitigating actions to prevent the healthy cells in the parallel modules from reaching a critical voltage and prevent or mitigate the overcharging condition.

According to an exemplary embodiment, BMS 112 is configured to monitor (e.g., continuously, periodically, etc.) various parameters of the energy storage 54, including voltage, current, and temperature of each cell, row, and/or module within the energy storage 54. In some embodiments, the BMS 112 is configured to calculate or otherwise determine the SOC of the energy storage 54, the battery module 404, and/or the add-on battery module(s) 406. In some embodiments, the BMS 112 is configured to redistribute charge among the cells, rows, and/or the modules to ensure an equal or substantially equal charge level throughout the energy storage 54. The BMS 112 can communicate with other systems or components or the vehicle 10 or with external devices (e.g., the remote systems 240) to report on battery status and diagnostics and/or to receive control commands.

According to an exemplary embodiment, the BMS 112 is configured to provide DC power to the motor controller 110 and the motor controller 110 is configured to convert the DC power to AC power and provide the AC power to the motor 408 to drive or propel the vehicle 10. More specifically, when the motor 408 is supplied with the AC power, the motor windings 410 of the motor 408 are configured to create a rotating magnetic field that drives an output of the motor 408 to drive the rear tractive assembly 56 and/or the front tractive assembly 58. However, as described in greater detail herein, under certain conditions, the motor controller 110 is configured to provide the DC power to the motor 408 without converting to AC power. When the DC power is provided to the motor windings 410, instead of creating a rotating magnetic field to turn the motor 408, the current flow through the resistance of the motor windings 410 generates heat without driving the output of the motor 408. Therefore, electrical energy from the energy storage 54 can be dissipated as thermal energy (e.g., heat) without mechanical movement of the vehicle 10, which can be implemented discharge the energy storage 54 in a controlled manner.

According to an exemplary embodiment, the BMS 112 is configured to detect faults or failures in the energy storage 54 that may potentially lead to or that have caused an overcharge condition and, thereby, a thermal runaway event. By way of example, the BMS 112 may be configured to monitor the voltage of individual cells, row, or modules of the energy storage 54, and when deviations from normal voltage levels occur beyond a nominal range, the BMS 112 may determine that a fault or failure is present and that there is a potential for an overcharge condition or that there is an actual overcharge condition. By way of another example, the BMS 112 may additionally or alternatively be configured to monitor current flows during charging and discharging of the energy storage 54 and identify unexpected fluctuations in current that may indicate that a fault or failure is present and that there is a potential for an overcharge condition or that there is an actual overcharge condition. By way of still another example, the BMS 112 may additionally or alternatively be configured to monitor the temperature of the cells, rows, and/or modules of the energy storage 54 and identify anomalously high temperatures that may indicate that a fault or failure is present and that there is a potential for an overcharge condition or that there is an actual overcharge condition. It should be understood that the above example of detecting faults, failures, or overcharge conditions is provided for example purposes only and is not exhaustive. Other methods or techniques may be implemented to detect faults, failures, or overcharge conditions, which are intended to be included within the scope of the present disclosure.

According to an exemplary embodiment, the BMS 112 is configured to send a discharge signal to the motor controller 110 to trigger a discharge protocol for the energy storage 54 in response to detecting a fault or failure to prevent an overcharge condition or to mitigate a currently present overcharge condition. The motor controller 110 is configured to provide DC power supplied by the energy storage 54 directly to the motor 408 without converting the DC power to AC power in response to receiving the discharge signal to initiate the discharge protocol to discharge the energy storage 54 by using the motor 408. Specifically, the DC power causes the motor 408 to act as a resistor that generates heat to dissipate the stored energy of the energy storage 54. The vehicle control system 100, therefore, is configured to reduce the SOC of the energy storage 54 when fault conditions are detected and, therefore, an overcharge condition can be prevented or mitigated. According to an exemplary embodiment, the vehicle control system 100 (e.g., the motor controller 110) is configured to disable driving functions of the vehicle 10 during the discharge protocol. If the vehicle 10 is currently being driven, the vehicle control system 100 may (a) wait for the vehicle 10 to come to a stop (e.g., by causing the brakes to be applied, by the vehicle 10 coasting to a stop once drive functions are disabled, etc.) before providing the DC power to the motor 408 and/or (b) no longer act upon throttle requests. In some implementations, the discharge protocol continues until the charge level of the battery system reaches (e.g., falls below) a pre-determined threshold. Further details regarding the discharge protocol are provided herein with respect to FIG. 5.

As shown in FIG. 4, the motor sensor 412 is disposed within or coupled to the motor 408. The motor sensor 412 is positioned to facilitate monitoring a temperature of the motor 408 (e.g., as a result of the heat generated by the motor 408, in the motor windings 410). In some embodiments, the motor controller 110 is configured to monitor the temperature of the motor 408 via the motor sensor 412, and the BMS 112 and the motor controller 110 are configured to manage the overcharge condition while attempting to maintain the motor 408 below a first or motor temperature threshold. By way of example, in some instances, excessive heat may be generated when the DC power is provided to the motor 408. Overheating the motor 408 can compromise components of the motor 408 and adjacent systems or components including as seals, bearings, lubricants, electrical componentry, plastic componentry. By monitoring temperature, the motor controller 110 may be configured to curtail the amount of the DC power provided to the motor 408 to maintain the motor 408 below the motor temperature threshold to prevent overheating the motor 408.

As shown in FIG. 4, the motor controller sensor 114 is disposed within or coupled to the motor controller 110. The motor controller sensor 114 is positioned to facilitate monitoring a temperature of the motor controller 110 (e.g., as a result of the heat generated by the motor controller 110 during the discharge protocol). In some embodiments, the motor controller 110 is configured to monitor the temperature thereof via the motor controller sensor 114, and the BMS 112 and the motor controller 110 are configured to manage the overcharge condition while attempting to maintain the motor controller 110 below a second or motor controller temperature threshold. By way of example, in some instances, excessive heat may be generated when the DC power is provided to the motor 408. Overheating the motor controller 110 can compromise components of the motor controller 110 and adjacent systems or components including as seals, bearings, lubricants, electrical componentry, plastic componentry. By monitoring temperature, the motor controller 110 may be configured to curtail the amount of the DC power provided to the motor 408 to maintain the motor controller 110 below the motor controller temperature threshold to prevent overheating the motor controller 110.

Accordingly, the motor controller 110 may be configured to monitor the temperatures of the motor controller 110 and the motor 408, and adjust the DC power (e.g., voltage, current, etc.) provided to the motor 408 to manage the generation of heat by the motor controller 110 and/or the motor 408. According to an exemplary embodiment, the BMS 112 and the motor controller 110 are configured to provide preferential treatment to or prioritize mitigating the overcharge condition in the energy storage 54 over maintaining the temperature of the motor 408 below the motor temperature threshold and the temperature of the motor controller 110 below the motor.

In some embodiments, the vehicle control system 100 is configured to additionally or alternatively power other electrically-operated components during the discharge protocol. By way of example, the vehicle control system 100 may be configured to operate various lights of the vehicle 10. By way of another example, the vehicle 10 may include a brake resistor that is configured to receive excess charge during regenerative braking operations with the motor 408. Accordingly, the vehicle control system 100 may leverage such brake resistor as another source to divert additional power to further increase SOC depletion of the energy storage 54. By way of yet another example, the vehicle control system 100 may be configured to operate a main contactor, heaters, chillers (e.g., Peltier devices), microprocessors, and/or still other electrically-operated component of the vehicle 10

Figure 5:
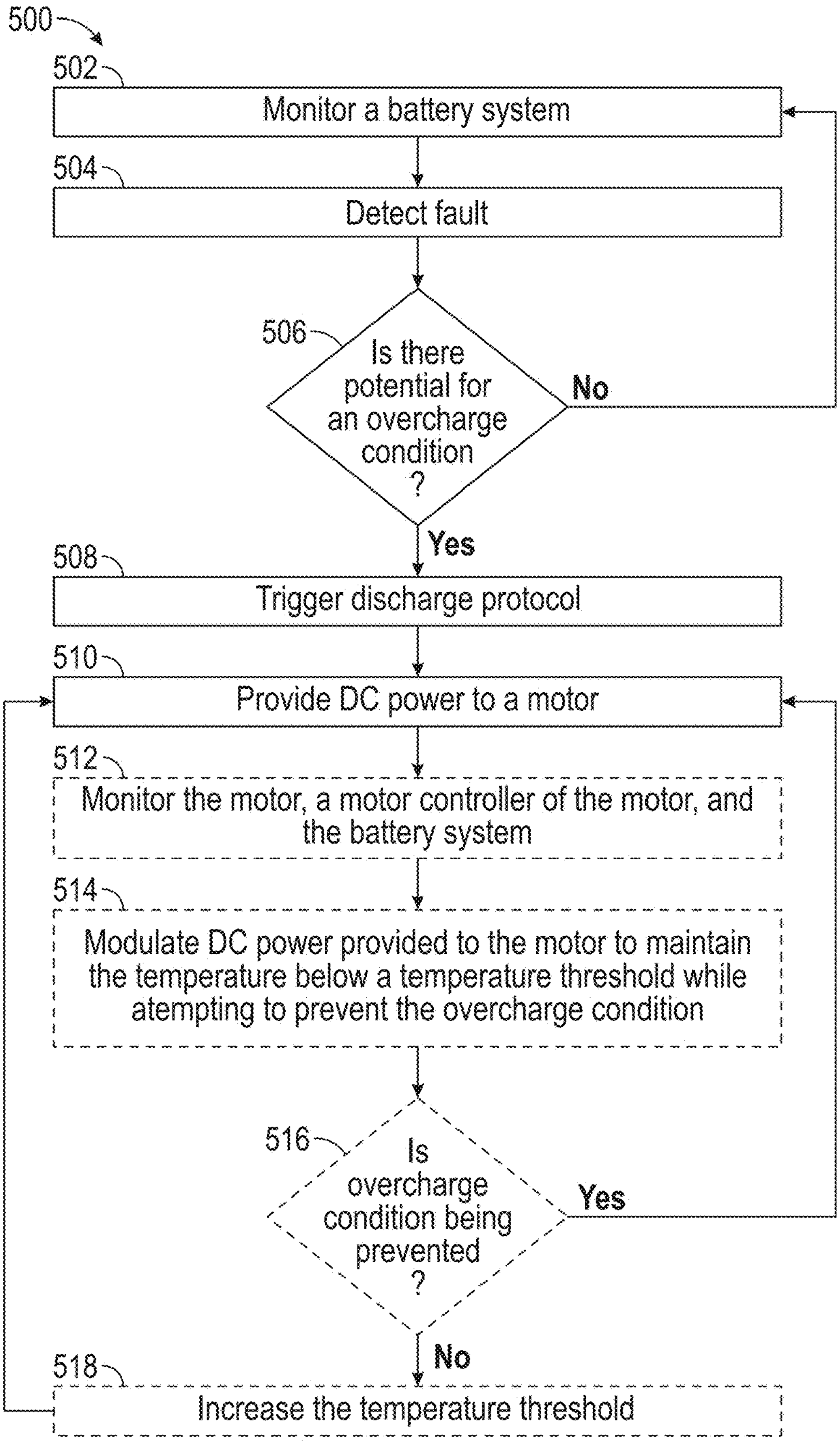
FIG. 5 is a block diagram of method for a battery discharge protocol, according to an exemplary embodiment.

As shown in FIG. 5, a method 500 for a battery discharge protocol. Method 500 may be performed by the vehicle control system 100 (e.g., the motor controller 110, the BMS 112, etc.). The method 500 may be implemented using any one or more of the components and devices detailed herein in conjunction with FIGS. 1-4. Additional, fewer, or different operations may be performed in the method 500 depending on the embodiment. At least one aspect of the operations is directed to a system, method, apparatus, or a computer-readable medium.

At step 502, a vehicle control system (e.g., the vehicle control system 100, the BMS 112, etc.) is configured to monitor a battery system (e.g., the energy storage 54, the battery module 404, the add-on battery module(s) 406, etc.) of a vehicle (e.g., the vehicle 10). At step 504, the vehicle control system is configured to detect a fault in the battery system. By way of example, the vehicle control system may be configured to identify any anomalies or deviations from normal parameters of voltage, current, resistance, impedance, temperature, etc. that may indicate issues such as cell imbalance, overcharging, undercharging, or thermal hazards. At step 506, the vehicle control system is configured to determine, based on data collected, if there is a potential for an overcharge condition (e.g., in the energy storage 54). If there is no potential for an overcharge condition, the vehicle control system is configured to return to step 502 and resume monitoring the battery system.

At step 508, the vehicle control system is configured to trigger a discharge protocol in response to determining that there is a potential for an overcharge condition or that an actual overcharge condition is present (e.g., the BMS 112 is configured to transmit a discharge signal to the motor controller 110). At step 510, the vehicle control system (e.g., the motor controller 110) is configured to stop providing AC power to an AC tractive motor (e.g., the motor 408), if the AC tractive motor is currently in operation, and start providing DC power the AC tractive motor. By providing DC power to the AC tractive motor instead of AC power, the AC tractive motor will stop rotating and become a resistive load where the DC power can be dissipated as heat, rather than a mechanical output.

Steps 512-518 may be optional (e.g., if temperature monitoring is not employed). At step 512, the vehicle control system (e.g., the motor controller 110, the BMS 112) are configured to monitor the AC tractive motor, a motor controller (e.g., the motor controller 110), and the battery system. Internal diagnostic capabilities, temperature sensors, current sensors, voltage sensors, etc. can allow the vehicle control system to monitor the AC tractive motor, the motor controller, and the battery system. In some embodiments, the vehicle control system is configured to monitor a first temperature of the motor controller (e.g., via the motor controller sensor 114) and/or a second temperature of the AC tractive motor (e.g., via the motor sensor 412).

At step 514, the vehicle control system (e.g., the motor controller 110) is configured to modulate the DC power provided to the AC tractive motor to maintain the first temperature of the motor controller below a first temperature threshold and/or maintain the second temperature of the AC tractive motor below a second temperature threshold while attempting to prevent the overcharge condition. At step 516, the vehicle control system (e.g., the BMS 112) is configured to assess whether the applied measures have prevented or are preventing the overcharge condition (e.g., stagnant, decreasing, not increasing, etc.). If the overcharge condition is being prevented (e.g., decreasing), the vehicle control system (e.g., the BMS 112 can instruct the motor controller 110) is configured to continue applying the DC power to the AC tractive motor at the current rate or level. If the vehicle controller determines that the overcharge condition has been sufficiently prevented (e.g., a SOC lower than a discharge threshold, the SOC being zero, etc.), the vehicle control system is configured to end the discharge protocol.

Alternatively, at step 518, when the overcharge condition is not being adequately prevented or mitigate, the vehicle control system is configured to increase the temperature threshold, which permits the motor controller 110 to increase the DC power provided to the AC tractive motor to further discharge the battery system. The increase in the DC power to the AC tractive motor may more rapidly decrease the SOC of the battery system, but cause the first temperature and/or the second temperature to increase above their respective thresholds. Accordingly, the vehicle control system may be configured to prioritize prevention of the overcharge condition over maintaining the motor controller and/or the motor at lower temperatures.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and descriptions may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the site monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A golf vehicle comprising:
- a chassis;
- a front axle coupled to the chassis;
- a rear axle coupled to the chassis;
- a battery pack supported by the chassis, the battery pack including a plurality of battery cells;
- an electric motor powered by the battery pack, the electric motor configured to drive at least one of the front axle or the rear axle, the electric motor being a three-phase alternating current motor; and
- a vehicle control system including:
  - a battery management system coupled to the battery pack, the battery management system configured to:
    - monitor the battery pack;
    - detect a fault; and
    - trigger a discharge protocol for the battery pack in response to the fault to prevent an overcharge condition; and
  - a motor controller coupled to the electric motor and the battery management system, the motor controller configured to provide direct current power from the battery pack to the electric motor to discharge the battery pack in response to the discharge protocol.

2. The golf vehicle of claim 1, wherein the direct current power causes the electric motor to generate heat to discharge the battery pack without driving the at least one of the front axle or the rear axle.

3. The golf vehicle of claim 1, wherein the motor controller is further configured to adjust at least one of a voltage or a current of the direct current power provided to the electric motor.

4. The golf vehicle of claim 1, wherein the vehicle control system is configured to monitor at least one of a first temperature of the motor controller or a second temperature of the electric motor during the discharge protocol.

5. The golf vehicle of claim 4, wherein the vehicle control system is configured to monitor the first temperature and the second temperature.

6. The golf vehicle of claim 5, further comprising:

a first temperature sensor positioned to facilitate monitoring the first temperature of the motor controller; and a second temperature sensor positioned to facilitate monitoring the second temperature of the electric motor.

7. The golf vehicle of claim 4, wherein the vehicle control system is configured to modulate the direct current power provided to the electric motor to maintain at least one of (a) the first temperature of the motor controller below a first temperature threshold or (b) the electric motor below a second temperature threshold while attempting to prevent the overcharge condition.

8. The golf vehicle of claim 7, wherein the vehicle control system is configured to modulate the direct current power provided to the electric motor to maintain the first temperature of the motor controller below the first temperature threshold and the electric motor below the second temperature threshold while attempting to prevent the overcharge condition.

9. The golf vehicle of claim 8, wherein the vehicle control system is configured to permit at least one of (a) the first temperature of the motor controller to exceed the first temperature threshold or (b) the second temperature of the electric motor to exceed the second temperature threshold to prioritize prevention of the overcharge condition.

10. The golf vehicle of claim 9, wherein the vehicle control system is configured to permit the first temperature of the motor controller to exceed the first temperature threshold and the second temperature of the electric motor to exceed the second temperature threshold to prioritize prevention of the overcharge condition.

11. The golf vehicle of claim 1, wherein the motor controller is configured to ignore throttle commands from an operator during the discharge protocol.

12. The golf vehicle of claim 1, wherein the motor controller is configured to wait for the golf vehicle to come to a stop if moving before providing the direct current power to the electric motor.

13. The golf vehicle of claim 1, wherein the battery pack includes a first battery module including a first plurality of battery cells and a second battery module including a second plurality of battery cells, and wherein the first battery module and the second battery module are connected in parallel.

14. The golf vehicle of claim 1, wherein the vehicle control system is configured to power one or more electrically-operated components of the golf vehicle with the battery pack as part of the discharge protocol, the one or more electrically-operated components including at least one of a brake resistor, lights, microprocessors, a heater, or a chiller.

15. The golf vehicle of claim 1, wherein the vehicle control system is configured to continue the discharge protocol until a charge level of the battery pack falls below a threshold.

16. The golf vehicle of claim 1, wherein the vehicle control system is configured to:

monitor a first temperature of the motor controller of the golf vehicle and a second temperature of the electric motor during the discharge protocol;

modulate the direct current power provided to the electric motor to maintain the first temperature of the motor controller below a first temperature threshold and the electric motor below a second temperature threshold; and permit the first temperature of the motor controller to exceed the first temperature threshold and the second temperature of the electric motor to exceed the second temperature threshold to prioritize prevention of the overcharge condition of the battery pack during the discharge protocol.

17. The golf vehicle of claim 1, wherein the motor controller is configured to:

ignore throttle commands from an operator during the discharge protocol; and wait for the golf vehicle to come to a stop if moving before providing the direct current power to the electric motor.

18. The golf vehicle of claim 1, wherein the motor controller is configured to provide the direct current power to the electric motor without creating a rotating magnetic field that turns the electric motor.

19. A vehicle system comprising:

one or more processing circuits including one or more memory devices storing instructions thereon that, when executed by one or more processors, cause the one or more processors to:

monitor a battery system of a vehicle, wherein the battery system is configured to provide power to an alternating current motor of the vehicle that drives an axle of the vehicle;

detect a fault associated with the battery system;

trigger a discharge protocol for the battery system in response to the fault;

provide direct current power from the battery system to the alternating current motor to discharge the battery system in accordance with the discharge protocol;

monitor a first temperature of a motor controller of the vehicle and a second temperature of the alternating current motor during the discharge protocol;

modulate the direct current power provided to the alternating current motor to maintain the first temperature of the motor controller below a first temperature threshold and the alternating current motor below a second temperature threshold; and permit the first temperature of the motor controller to exceed the first temperature threshold and the second temperature of the alternating current motor to exceed the second temperature threshold to prioritize prevention of an overcharge condition of the battery system during the discharge protocol.

20. A vehicle system comprising:

one or more processing circuits including one or more memory devices storing instructions thereon that, when executed by one or more processors, cause the one or more processors to:

monitor a battery system of a vehicle, wherein the battery system is configured to provide power to an alternating current motor of the vehicle that drives an axle of the vehicle;

detect a fault associated with the battery system;

trigger a discharge protocol for the battery system in response to the fault;

provide direct current power from the battery system to the alternating current motor to discharge the battery system in accordance with the discharge protocol;

ignore throttle commands from an operator during the discharge protocol; and wait for the vehicle to come to a stop if moving before providing the direct current power to the alternating current motor.

* * * * *